Sept. 2, 1941.                T. B. GIBBS                 2,254,649
                         RECORDING APPARATUS
             Filed March 25, 1937            7 Sheets-Sheet 1

INVENTOR.
Thomas B. Gibbs
BY Richardson & Ques
ATTORNEYS.

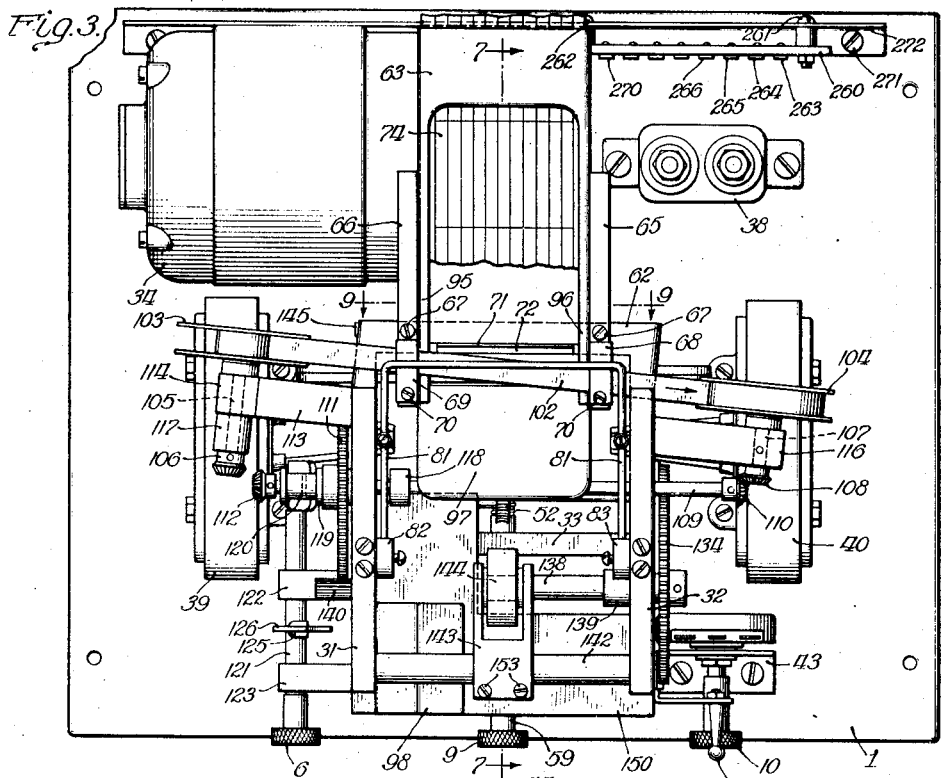
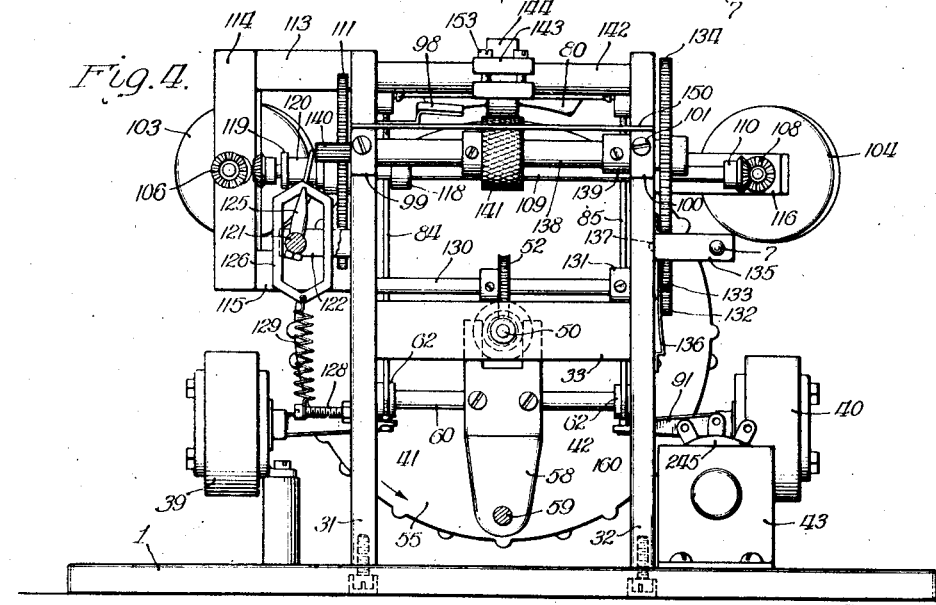

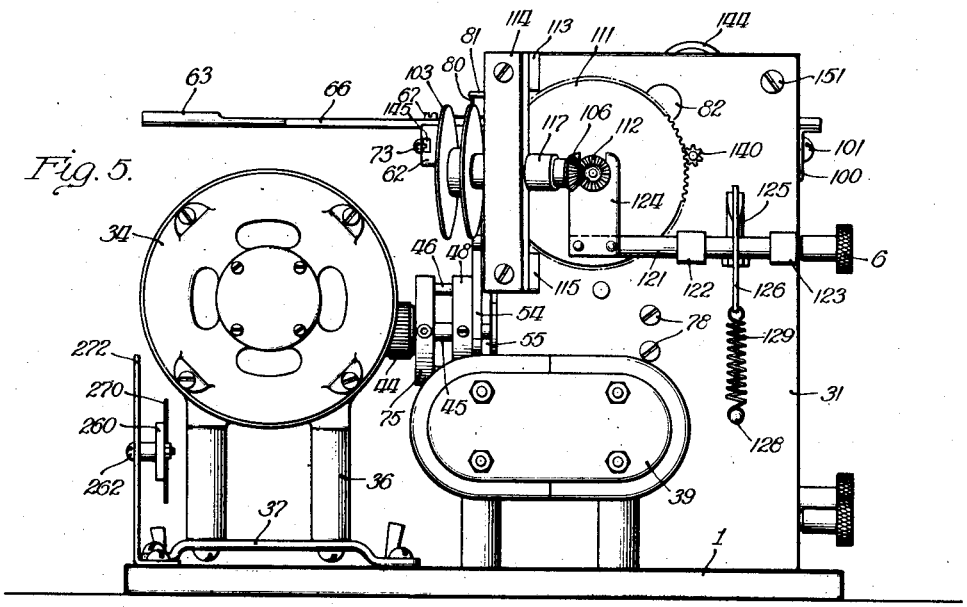

Sept. 2, 1941.  T. B. GIBBS  2,254,649
RECORDING APPARATUS
Filed March 25, 1937  7 Sheets-Sheet 4

INVENTOR.
Thomas B. Gibbs
BY
ATTORNEYS.

Sept. 2, 1941.　　　T. B. GIBBS　　　2,254,649
RECORDING APPARATUS
Filed March 25, 1937　　　7 Sheets-Sheet 5
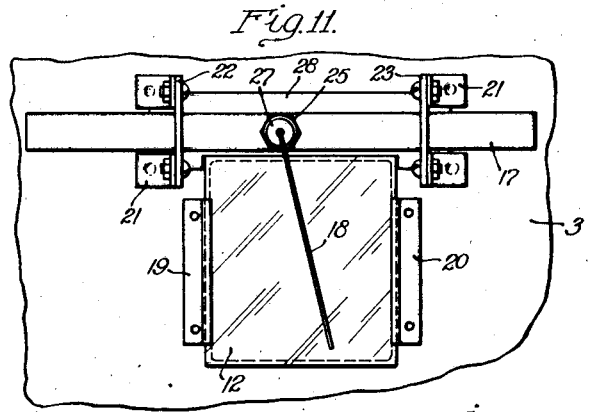
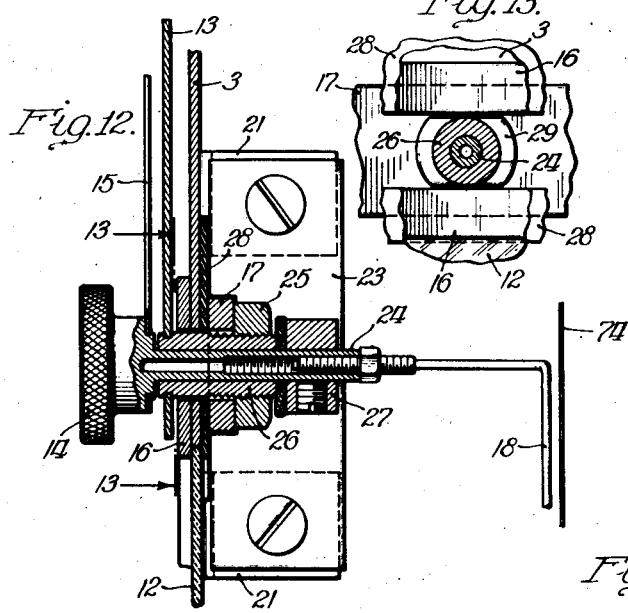
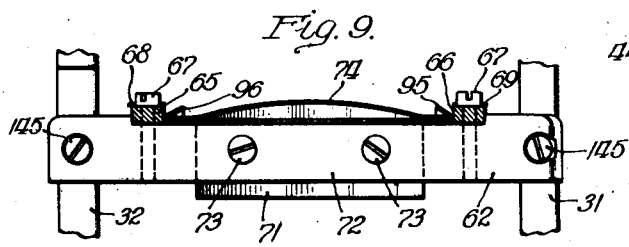
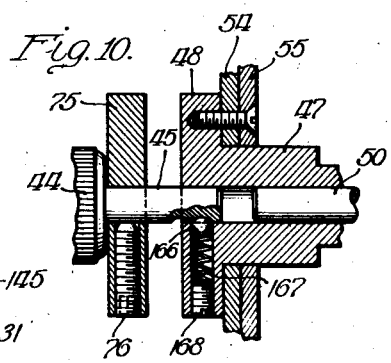
INVENTOR.
Thomas B. Gibbs
BY
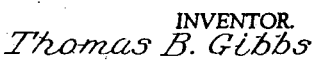
ATTORNEYS.

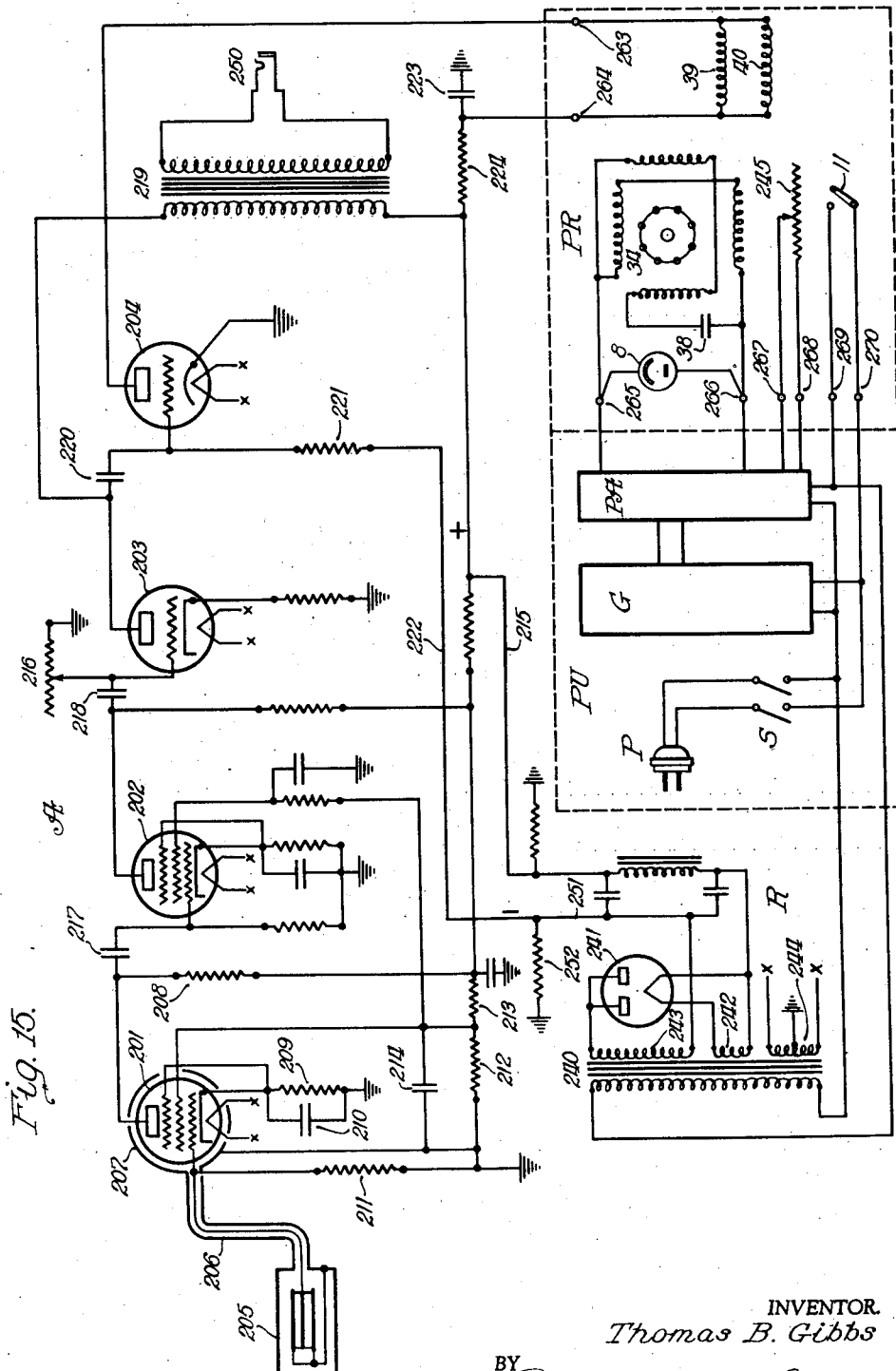

Sept. 2, 1941.   T. B. GIBBS   2,254,649
RECORDING APPARATUS
Filed March 25, 1937   7 Sheets-Sheet 7

Inventor.
Thomas B. Gibbs
By: Richardson & Auer
Attys.

Patented Sept. 2, 1941

2,254,649

UNITED STATES PATENT OFFICE 2,254,649

RECORDING APPARATUS

Thomas B. Gibbs, Chicago, Ill.

Application March 25, 1937, Serial No. 133,071

27 Claims. (Cl. 73—51)

The present invention relates in general to recording apparatus, and more in particular to a recording apparatus which operates under control of two independent agencies to produce a single record. As disclosed herein, the invention is a watch timing apparatus, comprising means for making a printed record under the joint control of a watch being tested and a fixed and constant time or frequency standard. The objects of the invention, therefore, are to produce a new and improved recording apparatus, and to produce an apparatus of this character, including ancillary arrangements, mechanical and electrical, which is especially adapted for use in timing and regulating watches in a rapid and convenient manner.

The invention, together with the various novel features thereof, will be described in detail hereinafter with reference to the accompanying drawings, in which—

Fig. 3 is a top or plan view of the printer, with the outside casing removed;

Fig. 4 is a front view of the printer, also with the casing removed;

Figs. 5 and 6 are views from the left and right sides, respectively, of the printer shown in Figs. 3 and 4;

Fig. 9 is a fragmentary section on the line 9—9, Fig. 3;

Fig. 10 is another fragmentary section taken on the line 10—10, Fig. 7;

Fig. 11 is a view of a portion of the under side of the cover 3 of the casing, showing the mounting arrangement for the indicator;

Fig. 12 is a cross section through the indicator on the line 12—12, Fig. 1;

Fig. 13 is a fragmentary section taken on the line 13—13, Fig. 12;

Fig. 14 shows a piece of paper tape on which a number of records have been printed;

Fig. 15 is a diagrammatic circuit drawing which shows an amplifier A for amplifying impulses produced by the ticking of a watch, a constant frequency generator G, a power amplifier PA, and the electrical connections between these items of equipment and the printer;

Figure 1:
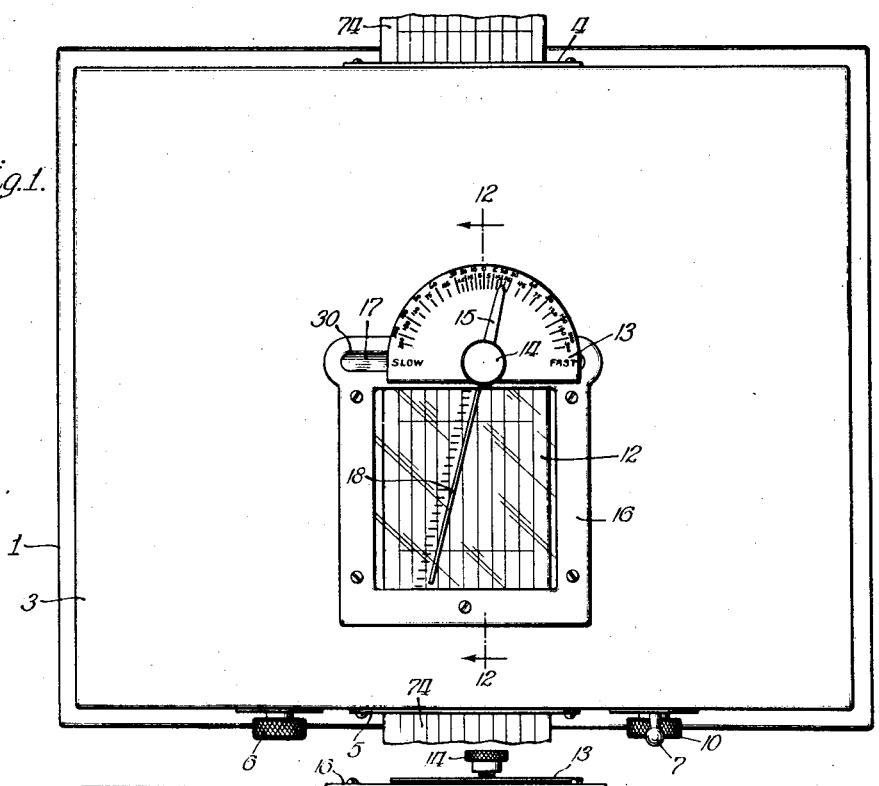
Fig. 1 is a top or plan view of the mechanical part of the apparatus, which for convenience will be referred to hereinafter as a printer.
Figure 2:
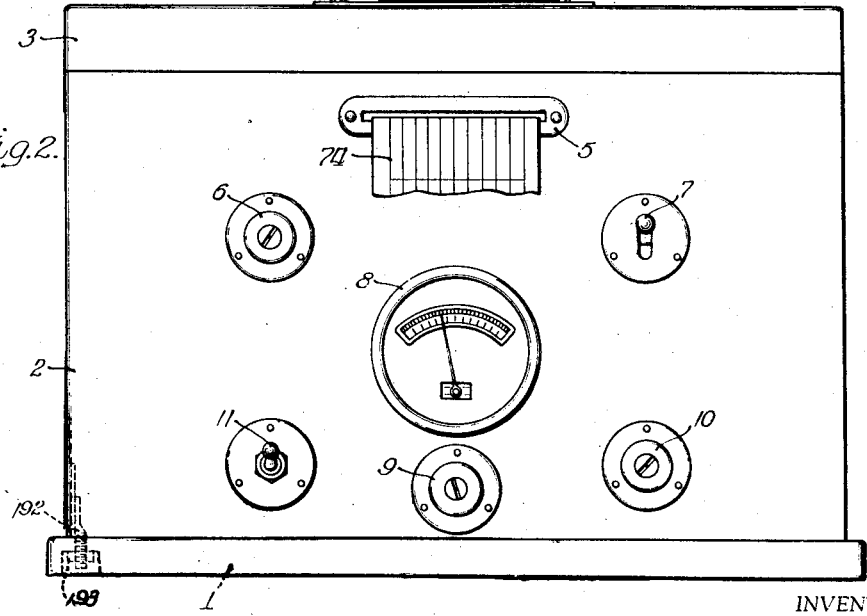
Fig. 2 is a front view of the printer, showing the arrangement of the various operating and control devices.

Referring now particularly to Figs. 1 and 2, the various parts of the printer are mounted on a metal base 1 and are enclosed within a casing 2. The base 1 is rectangular, as seen in Fig. 1, and is thick enough to afford a rigid and substantial support for the parts. The casing 2 may be of sheet metal, and includes the removable cover 3 of the same material. The casing and cover may be finished in a suitable manner in order to afford protection to the material and to give the casing a neat and attractive appearance. The casing may be secured to the base by means of four lugs, such as 192, Fig. 2, which pass through the base and are threaded to receive nuts such as 193, which lie in recesses on the under side of the base.

The front of the casing serves as a sort of control panel on which appear various instrumentalities for controlling the operation of the printer and the associated equipment. The reference character 8 indicates a voltmeter which is mounted in an opening in the casing. On the printer itself, inside the casing, are mounted various controls, including a ribbon-reversing mechanism, a printer disk-shifting mechanism, and a voltage control rheostat. These devices are provided with shafts extending forwardly to the front of the casing, where they are fitted with operating knobs 6, 9, and 10, respectively. The printer also includes a gear throwout device having an operating lever which extends through to the front of the casing, as shown. These parts will all be described in detail later on. There is also a switch 11, which is of the common panel mounting type as used in radio sets. Suitable escutcheon plates may be provided on the front of the casing to finish off the openings provided for the control devices.

Near the top of the casing there is provided an opening or slot in front of which is positioned the slotted escutcheon plate 5. There is a similar opening and slotted escutcheon plate 4 in the rear wall of the casing. The paper tape 14 on which the records are printed may be supplied in the form of a roll which is supported in any suitable manner, preferably on the outside of the casing at the rear. As the paper leaves the roll it enters the casing at 4, and passes through the printing mechanism, after which it passes beneath a window in the cover 3, and then leaves the casing at 5. The printer includes suitable means, which will be described, for advancing the paper at the proper speed.

Associated with the window in the cover of the casing is a direct reading indicator mechanism which will now be described, reference being had to Figs. 1 and 11 to 13, inclusive.

There is a rectangular opening cut in the cover 3, and in this opening there is positioned a sheet of glass 12. The glass is supported from below by two metal strips 19 and 20, as seen in Fig. 11.

These strips may be spot-welded to the cover 3 on the inside. On the outside of the cover 3 there is secured an escutcheon plate 16, which has a rectangular opening therein slightly smaller than the sheet of glass and holds the latter in place. The foregoing describes the window previously referred to. Just to the rear of the window, as seen in Fig. 1, the plate 16 has a slot 30, which corresponds to similar slots in cover 3 and the fiber sheet 20, and through which can be seen a portion of the bar 17. The bar is fully exposed in Fig. 11, which also shows the means for holding it in place. This latter comprises four small brackets 21, spot-welded to the cover 3, and two strips of fiber 22 and 23 which are secured to the brackets 21 by means of small screws and nuts as shown. The fiber strips 22 and 23 are notched or recessed on the side next to the bar 17 and form guides which hold the bar 17 in position and at the same time permit a longitudinal sliding movement thereof. The sheet of fiber 20 is inserted between bar 17 and the cover 3. This fiber sheet is notched at the corners to fit between the brackets 21 and is held against the cover by the strips 22 and 23.

Referring now particularly to Figs. 12 and 13, there is a tubular member 26, which carries at one end the semi-circular plate 13, and which is threaded at the other end. The member 26 is positioned in the slot 30, and the threaded end passes through a hole in bar 17. That portion of member 26 which lies within the slot 30 has a shoulder 29, Fig. 13, which is flattened on both sides to afford an easy sliding fit in the slot and at the same time prevent the member 26 from turning. The bar 17 is rigidly secured to member 26 by nut 25, which clamps the bar against the shoulder 29. Inside the tubular member 26 there is mounted a shaft 24, which has a head in the form of a knurled knob 14. The shaft 24 is held in place by a washer of resilient material and a ring 27, the latter being locked on the shaft by means of a set screw. An alignment rod 18 is threaded into the end of shaft 24 and is locked in position by means of a small nut. The horizontal portion of the rod lies just above the paper tape 74.

It will be seen that the construction described provides an adjustable mounting for the plate 13 bearing the scale and for the knob 14, pointer 15, and alignment rod 18. By grasping the knob 14 the whole assembly including the parts mentioned can be slid to the right or left along the slot 30, Fig. 1, and in any position the shaft 24 carrying the pointer 15 and alignment rod 18 can be rotated by means of the knob 14. The use of the pointer and scale will be described during the explanation of the operation of the invention.

This completes the description of the exterior features of the printer, including the casing and cover and the parts mounted thereon. The cover 3 may of course be removed when desired, to expose the printer from above. The entire casing can be removed from the base when necessary to inspect or repair parts that cannot be reached upon removal of the cover alone. In order to remove the casing, the operating knobs 6, 9, and 10 have to be taken off and the lever 7 must be removed, which can be done from the inside after the cover 3 is taken off. If the switch 11 and the voltmeter 8 are furnished with binding posts, these parts remain with the casing after the conductors are disconnected; but if soldered connections are used, it is preferable to dismount the switch and voltmeter and leave them attached to the printer by their conductors. The nuts 133 are then unscrewed from the lugs 192, and the casing can be lifted off.

It will be assumed now that the casing has been removed, and the various parts of the printer will be described. Most of these parts are supported on a frame which comprises two rectangular plates 31 and 32 and a cross member 33. The plates 31 and 32 are mounted vertically on the base 1, as seen clearly in Figs. 3 to 6, inclusive. They are rigidly secured to the base by means of screws which pass through countersunk holes in the base, as indicated by dotted lines in Fig. 4. The cross member 33 extends between the two plates, and one end is secured to plate 31 by means of screws 78, while the other end is secured to plate 32 by means of screws 79. This frame affords a suitable support for various shafts and other parts, the explanation of which will be taken up in due course.

At the rear of the base and to the left as it appears in Fig. 3 is mounted a motor 34, which supplies the power for operating the moving parts of the printer. This motor should be of the synchronous type and may be large enough to develop about 1/15 horse power. The means for mounting the motor on the base is clearly shown in Figs. 5 and 6, and comprises two brackets 37 and four spacer studs 36. The studs 36 are threaded into the frame of the motor and are secured to the brackets 37 by means of screws. Other screws serve to secure the brackets 37 to the base.

The reference character 38 indicates a condenser, which is suitably mounted on the base 1 near the motor. This condenser is included in the motor circuit, as shown in Fig. 15.

At one end of the motor (see Fig. 6) is a set of speed-reducing gears which is enclosed in a casing 35. This casing includes the right-hand end bearing plate for the motor shaft, and the speed-reducing gears are therefore supported on the motor and may be considered as forming part of the motor assembly. By means of the speed-reducing gears the motor 34 drives the shaft 45, which can be seen in Figs. 5 and 6, and also in Fig. 7. The motor 34 preferably runs at a speed of 1800 revolutions per minute, although this is not essential. The ratio of gear reduction, however, should be such that the shaft 45 is driven at a speed of 5 revolutions per second. If the motor speed is 1800 R. P. M., therefore, the ratio of the motor speed to that of the shaft 45 is as 6 is to 1.

The shaft 45 directly drives the printer disk assembly, which will now be described, reference being made particularly to Fig. 7. The printer disks are indicated by reference characters 54 and 55, respectively. The disk 54 has eleven spaced teeth, such as 56, while the disk 55 has twelve similar teeth 57. The disks are preferably made of aluminum, and are of definite predetermined dimensions. In the case of the printer described herein, the circumference of the circle circumscribing the ends of the teeth is exactly 18 inches, as accurately as possible. The disks are mounted on a cylindrical member 47 which includes a head 48 at one end and has a circumferential groove 49 near the other end. The member 47 has a central longitudinal opening extending from one end to the other. As clearly seen in Fig. 7, the end of shaft 45 extends within the opening in member 47 and affords a support for the headed end thereof. A shaft 50 is driven into the other end of member 47 and is thus rigidly secured to it. Shaft 50 is reduced in size at the end opposite member 47 and passes through a bearing 53 which is supported on the cross member 33 of the frame. The printer disks 54 and 55 are bored out in the center to fit the cylindrical member 47, and lie against the head 48 to which they are secured by three machine screws. One of these screws appears in the sectional view, Fig. 10.

Figure 7:
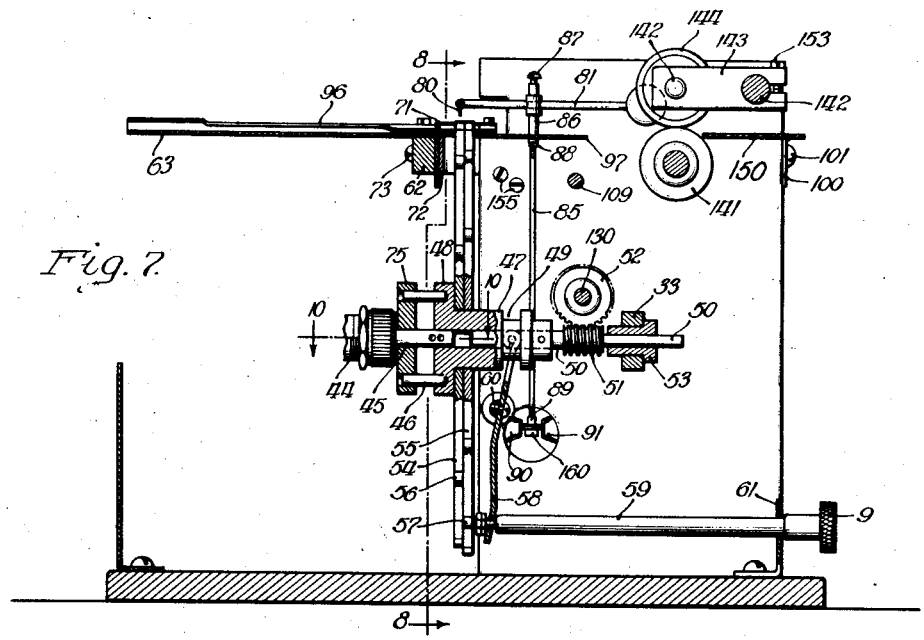
Fig. 7 is a section on the line 7—7, Fig. 3.

As seen in Fig. 7, the left-hand printer disk 54 is directly beneath the printer bar 80. The entire printer disk assembly may, however, be shifted to the left a short distance so as to bring the printer disk 55 beneath the printer bar. The shifting means comprises a lever 58 and a shifting rod 59. The construction and mounting for the shifting lever 58 may be understood from Fig. 4, together with Fig. 7. The lever 58 is rigidly secured by means of two screws to the cross shaft 60 which is rotatable in bearings in the frame members 31 and 32. Two collars 62 are provided, secured to cross shaft 60 by means of set screws, in order to prevent endwise movement of the shaft. Above the shaft 60 the lever 58 is bifurcated and the two ends of the lever are formed into small cylindrical extremities which lie in the groove 49 of member 47. At the lower end of the lever 58 there is an opening through which the reduced end of shifting rod 59 extends. This reduced end portion of rod 59 is threaded and carries lock nuts which prevent separation of the parts and yet permit the slight relative movement which is necessary. The shifting rod 59 is supported at the end opposite the lever 58 by a small bracket 61 which lies inside the casing when the latter is in position. The rod 59 is provided with the operating knob 9, previously referred to.

From the construction described, it will be evident that if the operating knob is pulled forward, or to the right as seen in Fig. 7, the shaft 60 will be rotated and the upper bifurcated end of lever 58 will move the printer disk assembly to the left. In order to accommodate this movement, the member 47 has a sliding fit on the shaft 45, and the shaft 50 is, of course, slidable in the bearing 53. Means are provided to accurately determine the two alternative positions of the printer disk assembly, which are not visible in Fig. 7, but which are, however, shown in Fig. 10. There is an opening drilled in the head 48 which extends clear through from the outside periphery of the head to the central bore of member 47. In this opening there is positioned a steel ball 166, a compressed coil spring 167, and a set screw 168 for retaining the spring in position. When the printer disk assembly is in the position in which it appears in Figs. 7 and 10, the ball 166 lies in a small depression in the shaft 45; and when the assembly is shifted to the left the proper distance, the ball 166 will lie in another and similar depression. This arrangement provides for accurately positioning the printer disks underneath the printer bar, without requiring any particular care in operating the shifting knob 9.

Figure 8:
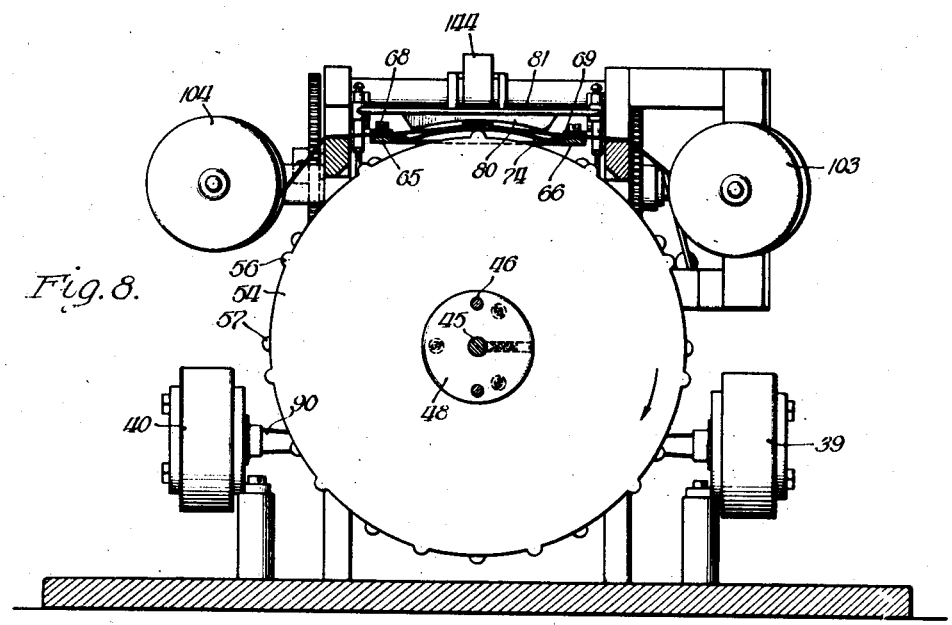
Fig. 8 is a section on the line 8—8, Fig. 7.

Inasmuch as the printer disk assembly is slidable on the round shaft 45, some additional means has to be provided in order to enable the shaft to drive the printer disk assembly. This means comprises a disk 75 and two pins 46. The disk 75 is rigidly secured to the shaft 45 by means of a set screw 76, as seen in Fig. 10. The two pins 46 have a drive fit in the head 48 and are slidable in holes drilled in the disk 75. It will be clear, therefore, that when the shaft 45 is rotated by the motor, the disk 75 will rotate with it and will drive the printer disk assembly through the pins 46. The direction of rotation is counterclockwise, as seen in front, or in Fig. 4, and clockwise, as seen in Fig. 8.

It will be convenient now to describe the arrangement for guiding and feeding the paper tape 74 through the printer. First to be mentioned is a chute 63, Fig. 3, which may be made of sheet metal. The rear end of the chute registers with the slot in plate 4, Fig. 1, when the casing is in place Beginning at a point about an inch or more from the rear end, the top of the chute is cut away, leaving only the two marginal strips 95 and 96 as guides for the paper. These strips or guides end a short distance in front of the ribbon 102, but the lower side of the chute continues forward some distance farther and forms an apron 97. The chute is of course of the proper width to accommodate the paper tape. The upper guides 95 and 96 are flattened down somewhat in the vicinity of the ribbon, but are spaced away sufficiently from the lower side of the chute to permit the paper to be drawn through easily.

The chute 63 is soldered to two bars 65 and 66. The assembly including the chute 63 and the bars 65 and 66 is supported on a heavy metal bracket 62, which is in turn mounted on the rear edges of the frame plates 31 and 32 by means of countersunk screws 145. The bracket 62 is shown clearly in Figs. 3 and 9. The chute assembly is secured to the bracket 62 by means of two screws 67, which pass through holes in bars 65 and 66 and are threaded into the bracket 62. It should be stated at this time that the lower wall of the chute 63 is cut away from a point just to the rear of the guide 71, Fig. 3, to a point just forward of the printer disks 54 and 55. The opening thus provided is occupied in part by the printer disks which, as can be seen from Fig. 8, extend upward somewhat above the level of the lower wall of the chute 63.

In order to give the paper tape an arc-shaped cross section as it passes over the printer wheels, a guide 71 is provided, seen clearly in Figs. 3 and 9. This guide lies in a recess which is cut in the bracket 62 and behind a plate 72 also contained in this recess. The guide 71 is clamped in place by two screws 73, Fig. 9, which pass through countersunk holes in the bracket 62, and through slots in the guide 71, and are threaded into the plate 72. The guide 71 is slotted at the points where the screws 73 pass through it, so that it can be adjusted up and down. The paper tape 74 is broken off in Fig. 3 so as not to obscure the parts which lie beneath it, but is shown in Fig. 9, from which it can be seen that the guide 71 raises the central portion of the tape along a curved line which conforms to the curvature of the circumference of the printer disks. The relation between the paper tape and the printer disks as the tape passes over them is shown clearly in Fig. 8.

After leaving the vicinity of the printer disks the tape passes along the apron 97 and onto a plate 150. This plate is cut away to provide room for the two feed rolls 141 and 144. The paper passes between these rolls, which draw it through the printer. The guide 98 is provided to enable the paper to be readily fed through the slot in the front escutcheon plate 5 when a new piece of tape is being started into the machine. This guide plate 98 may be soldered to the plate 150. The latter plate has two downturned portions 99 and 100 which are secured to the frame plates 31 and 32, respectively, by screws such as 101, Fig. 4.

The upper roll 144 is rotatably supported at the bifurcated end of a member 143, which is clamped to a cross shaft 142 by means of two screws 153, as seen clearly in Figs. 3 and 4, also in Fig. 7. The cross shaft 142 extends between the frame plates 31 and 32, and is held in position by means of screws 151 and 152, which can be seen in Figs. 5 and 6, respectively. The outer rim of the roller 144 is preferably made of soft rubber. The roller is pressed down slightly against the lower roller 141, while the screws 151 and 152 are loose, and then these screws are tightened up to lock it in position.

The lower roller 141 has a positive drive which will now be explained. Reverting back to Fig. 7, it will be seen that the shaft 50 carries a worm wheel 51 which is in engagement with a gear 52. This gear can also be seen in Fig. 4. The gear 52 is rigidly secured to a shaft 130, which has bearings in the frame members 31 and 32. A collar 131, secured to the shaft 130 by means of a set screw, serves to prevent endwise movement of the shaft to the right, as seen in Fig. 4. The shaft 130 extends through the frame plate 32, and as seen in Fig. 6 carries a small gear wheel 132, which is rigidly secured to the shaft. This gear wheel meshes with another small gear wheel 133, which is rotatably mounted on the throw-out lever 135, and which is in mesh with the gear wheel 134. One end of the throw-out lever 135 is pivotally supported on the shaft 130 between the gear wheel 132 and the frame plate 32. The other end is held in position by a bracket 136 secured to the frame plate 32 by means of two screws. This bracket 136 may be of springy material and is tensioned toward the frame plate so as to hold the end of the lever 135 against the frame plate. As shown in Fig. 4, the throw-out lever 135 has a small projection 137 which enters a depression in the frame plate 32 when the lever is in the position in which it is shown in Fig. 6. This serves to hold the lever in position and to keep the gear 133 in mesh with the gear 134. It will be clear that, if the extension lever or handle 7 is pulled down, the spring bracket 136 will yield enough to permit the rounded projection 137 to rise out of the depression in the frame plate so that the lever 135 can be rotated around the shaft 130 far enough to disengage gear 133 from gear 134.

The gear 134 is rigidly secured to a shaft 138, which is provided with bearings in the frame plates 31 and 32. A collar 139 prevents endwise movement of the shaft to the right, as seen in Fig. 4. Near the center of the shaft the roller 141 is mounted, being secured to the shaft by a set screw. This roller is in engagement with the upper roller 134 and may have a knurled periphery so as to provide a good frictional surface for contact with the paper tape.

It will be clear now that, when the shaft 50 is driven by the motor 34 through the means previously described, the worm wheel 51 will drive the shaft 130 by means of the gear 52. With the throw-out lever 135 in the position in which it is shown in Fig. 6, the gears 132, 133, and 134 are effective to transmit the motion of shaft 130 to the shaft 138, which in turn drives the roller 141. If the throw-out lever 7 is pulled down, the gears 133 and 134 are disengaged, and rotation of the shaft 138 and roller 141 will cease.

The arrangement of the ribbon and its driving mechanism will now be described. The ribbon is indicated by the reference character 102. It is carried on the two spools 103 and 104. After leaving spool 103, the ribbon passes over the left-hand rounded edge of the bracket 62 and then through a slot or recess cut in the upper surface of the bar 66, as seen in Figs. 3 and 8. This recess is covered by a small metal plate 69, held in place by a screw 70. From this point the ribbon follows the contour of the upper surface of the paper tape 74, and then passes out through a slot or recess in the bar 65, which is covered by the metal plate 68, similar to plate 69. The ribbon then passes down over the right-hand edge of bracket 62 and over a corner of the frame plate 32, which parts are rounded off to provide a smooth surface, and then onto the spool 104. As the parts are shown in Fig. 3, the spool 104 operates as a takeup spool to draw the ribbon through the printer.

Considering now the means for driving spool 104, the shaft 138 is provided with a small pinion 140 just outside the frame plate 31, which is in engagement with a gear wheel 111. The gear wheel 111 is rigidly secured to a cylindrical member 119, which in turn is rigidly mounted on the shaft 109. The shaft 109 is provided with bearings in the frame plates 31 and 32 and at its right-hand end carries a small beveled gear 110. The spool 104 is mounted on a shaft 107, which is rotatable in the rectangular bar 116, and carries a small beveled gear 108 adapted to mesh with gear 110. The bar 116 may be secured to the frame plate 32 by means of screws 155, Fig. 7, passing through the frame plate and threaded into the bar.

It will be seen that, when the shaft 138 is rotated in the proper direction to draw the paper tape through the printer by means of roller 141, the motion of the shaft 138 will be transmitted to the shaft 109 by means of the pinion 140 and the gear wheel 111, and the latter shaft will drive the spool 104 by means of gears 110 and 108 in the proper direction to wind up the ribbon and pull it through the printer in a direction across the line of movement of the paper tape. The direction of travel of the ribbon is not exactly at right angles to the tape, but the parts are so arranged that the angle of intersection between the paper and the ribbon departs from a right angle by several degrees, as seen in Fig. 3. The reason for this construction will be explained later on.

When the ribbon is accumulated on spool 104, it may be wound back on the spool 103 by bringing into play a ribbon-reversing mechanism which will now be explained. The spool 103 is mounted on a shaft 105 which has a bearing in the vertical rectangular bar 114 and the member 117 which is rigidly secured to the bar. As shown in Fig. 5, the vertical bar 114 is attached to two horizontal bars 113 and 115 by means of screws, and the latter are in turn secured to the frame plate 31 in the same way, as has already been described in the case of the bar 116 which supports the spool 104. At the end of shaft 105 there is a small bevel gear 106 adapted to be engaged by the bevel gear 112 on shaft 109. As shown in Fig. 3, these gears are disengaged. The shaft 109 is capable of being given an endwise movement from right to left, however, so as to disengage gears 108 and 110 and engage gears 106 and 112.

The arrangement for accomplishing the foregoing includes the shaft 121, seen clearly in Fig. 5, which is rotatably mounted in bearings near the ends of the horizontal rectangular bars 122 and 123. These bars are secured to the frame plate 31 by means of machine screws in the same way as was described in connection with bars such as 116, 113, and 115. The right-hand end of shaft 121 carries the ribbon-reversing knob 6. The other end of the shaft 121 has secured to it a bifurcated lever 124, the upper divided end of which lies in a wide groove 120 in the cylindrical member 119, as seen clearly in Figs. 3 and 4. Between the bearings in bars 122 and 123, there is secured to the shaft 121 a short upright member 125 having a knife edge in its extremity. The member 125 forms part of a toggle, the other portion of which is member 126, seen clearly in Fig. 4, which also shows the relation between the parts. There is a coil spring 129 which is tensioned between the lower end of the toggle member 126 and the stud 128.

When the parts are in the position in which they are shown in Fig. 4, the line of pull of the spring 129 is to the right of the center of shaft 121, and accordingly the spring maintains the shaft rotated in a clockwise direction as far as it will go. The limit of the movement is determined by the engagement of the upper bifurcated end of lever 124 with the right-hand side of groove 120, the shaft 109 being moved as far to the right as it will go because of the fact that the hub of gear wheel 111 is resting against the frame plate 31. It will be clear now that if the knob 6 is rotated in a counterclockwise direction, as seen from the front of the machine, the shaft 121 will rotate in its bearings; and as soon as the toggle gets past dead-center to the left, the movement of the shaft will continue under the power supplied by the spring 129, causing the lever 124 to engage the left-hand side of the groove 120 and slide the shaft 109 to the left as far as it will go. The limit of the movement to the left is determined by the collar 118, secured to shaft 109 by means of a set screw. This collar should be so adjusted that when it rests against the side of the frame plate 31, the gears 106 and 112 will be properly engaged.

The construction of the printer bar and the means for operating it will now be described. The printer bar is indicated by the reference numeral 80 and is seen clearly in Fig. 8 and in other figures. The lower edge of this bar is arcuate, conforming to the curvature of the printer disks. The printer bar is supported on a rod 81, comprising a transverse section and two sections which extend parallel to the frame plates 31 and 32 just inside the frame, as seen clearly in Fig. 3. The printer bar 80 is soldered to the lower side of the transverse section, where the latter crosses the ribbon 102. The two parallel sections of the rod 81 are secured at their ends to a pair of short studs 82 and 83, which are located in openings in the frame plates 31 and 32, respectively. Two set screws are used to hold the rod 81 in the studs 82 and 83, as shown in Fig. 3. The studs are rotatable in the frame plates for the purpose of adjusting the elevation of the printer bar, and are locked in position by means of set screws extending down from the top of the frame plates. As seen in Fig. 3, there are two set screws for securing the stud 82, and two similar set screws for securing the stud 83.

The printer bar is operated by means of two polarized electro-magnetic units 39 and 40, which may be similar to the units used in a well known type of loud speaker. These units are mounted on the base plate 1, as shown clearly in Figs. 4, 5, and 6.

Considering the unit 40, there are two tapering metal strips 90 and 91 attached to opposite sides of the armature inside of the unit, and these strips extend to the left, as seen in Fig. 4, and pass through an opening in the frame plate 32. As seen clearly in Fig. 7, the ends of the strips are folded so that they overlap each other and may be secured together by means of solder or by a small tubular rivet. The strips 90 and 91 may be considered as an extension of the armature of the unit 40, for operating the pull rod 85. This pull rod and its connection with the rod 81 on which the printer bar 80 is mounted is shown fully in Fig. 7. Rod 85 is provided at the lower end with a shank 89, having a head 160. The rod is passed up through a hole in the base plate 1 and through an opening in the overlapping end portions of strips 90 and 91, and is then screwed into the member 86 on rod 81. The head 160 may be slotted so that a screwdriver can be passed through the hole in the base in order to turn the rod 85. The member 86 is clamped to rod 81 by means of a set screw 87. Rod 85 is preferably adjusted so that with the parts in normal position, a slight downward tension is placed on the rod 81. When the proper adjustment is secured, the rod 85 may be locked in position by means of a small nut 88. The arrangement of the other unit 39 is the same as has been described, there being provided another pull rod 84 which is attached to the printer bar rod 81 in the same way as pull rod 85. It will be clear from the construction described that, when the units 39 and 40 are energized in the proper direction, they will exert a downward pull on rods 84 and 85, and will bend the rod 81 sufficiently to bring the printer bar 80 against the ribbon 102 and depress the same.

The rheostat 245 may be mounted on a small bracket 43, as seen in Fig. 6, and is fitted with the control knob 10. At the rear of the base there is a metal plate 272, on which is mounted a terminal strip 260. The terminal strip and arrangement thereof will be described more in detail in connection with the circuit drawing, Fig. 15.

Referring now to the circuit drawing, Fig. 15, the reference character A indicates a so-called tick amplifier for amplifying tick impulses produced by a watch under test and for suitably modifying the amplified impulses to a form which is adapted for operating the electro-magnetic units 39 and 40. As shown herein, the tick amplifier may comprise two type 57 pentodes 201 and 202, a type 56 triode 203, and a type 85 thyratron 264.

The means for picking up the watch ticks and for converting them into impulses for transmission to the amplifier comprises a microphone 205, which may be similar to the one described in my co-pending application, Ser. No. 124,570, filed February 8, 1937. This microphone is of the piezo-electric type, and one terminal of the crystal element—preferably the one connected to the central electrode—is connected by a conductor to the control grid of the first amplifier pentode 201. This conductor is surrounded by a metallic sheet 206 which is connected at one end to the casing of the microphone 205, and at the other end to the cap 207 of the shielding can surrounding the tube. The other terminal of the crystal element is connected with the microphone casing and is therefore grounded through the casing, the sheath 206, and the can.

The circuit connections for the first stage pentode 201 are similar to those commonly used. The plate of the tube is connected to the plus B lead through a resistor 208. The suppressor grid, the grid next to the plate, is connected to the cathode, and the latter is connected to ground through a resistor 209, shunted by a condenser 210. This is an arrangement commonly employed to provide a negative grid bias for the cathode. The screen grid of the tube is connected to the plus B lead at a point between the resistors 212 and 213, so that the voltage on the screen grid will be somewhat less than the voltage on the plate. There is a high resistance grid leak 211 connected between the control grid and ground.

The plate circuit of the pentode 201 is coupled to the control grid of the second stage pentode 202 by means of a condenser 217. The circuit arrangement of the tube 202 is similar to that of tube 201, and consequently need not be further described.

The plate circuit of the pentode 202 is coupled to the control grid of the triode 203 by means of a condenser 218. The control grid is connected to ground through the variable resistance 216, which is used as a volume control.

The plate circuit of triode 203 includes the primary winding of the transformer 219. The secondary winding is connected to the phone jack 250.

The plate circuit of triode 203 is coupled to the control grid of the gas filled tube 204 by a condenser 220. The control grid of this tube is connected by way of a resistor 221 and conductor 222 to the negative side of the rectifier R, so that the tube is normally biased to cut off condition; that is, it normally passes no current. Associated with the plate circuit of the tube 204 is a condenser 223, one side of which is grounded. The other side of the condenser is connected to the plus B lead through a resistor 224. The condenser 223 is therefore normally charged. It may be discharged over a circuit which includes the grounded cathode of the tube 204, the plate of the tube 204, and the electro-magnetic units 39 and 40, when the negative grid bias on the control grid of the tube 204 is reduced sufficiently to allow the tube to pass current.

The rectifier R is a conventional tye of half-wave rectifier, comprising a transformer 240 and a rectifier tube 241. The transformer 240 is provided with a winding 242 for supplying current to the cathode of the rectifier tube. The cathode is connected through a suitable filter to the plus B lead 215. The transformer also has a rectifier winding 243, one terminal of which is connected to the plates of the rectifier tube, while the other terminal is connected to the negative output lead 251, and through the resistor 252 to ground. A third winding 244 of the transformer serves to provide heater current for the amplifier tubes and the tube 204. It will be understood that the various heater circuits which are labeled X—X in the drawings are connected to the terminals X—X of the winding 244.

The tick amplifier A and the rectifier R may be assembled as a unit in a suitable receptacle or casing, in accordance with well known practice in the radio art. The microphone may be mounted on the exterior of the casing where it will be readily accessible.

Fig. 15 also shows the circuit connections between the printer, the amplifier unit, and the power source. All the electrical parts of the printer, including the motor 34, the electro-magnetic units 39 and 40, the voltmeter 8, the voltage control rheostat 245, and the switch 11, are shown diagrammatically in the dotted rectangle which is labeled PR. These parts are all wired up to a terminal strip 260, which can be seen in Figs. 3, 5, 6, and other figures.

The terminal strip 260 is mounted on a plate 272 which is secured to the base 1 by means of screws such as 271, and which conforms in size to an opening which is cut in the casing 2 at the rear. The plate 270 therefore really forms part of the casing when the latter is in place, but remains attached to the base when the casing is removed. Secured to the terminal strip 260 is a row of eight terminals 263 to 270, inclusive. These terminals afford means for connecting the various wires coming from the electrical equipment in the printer, as shown in Fig. 15.

The motor 34 of the printer may be driven from any available source of constant frequency 60-cycle alternating current, but as it is somewhat difficult to obtain a current source of the requisite constant frequency, I prefer to employ a constant frequency source, such as is described in my co-pending application, Ser. No. 124,571, filed February 8, 1937. This equipment may be referred to as a power unit, and is indicated within the dotted rectangle labeled PU. The complete power unit comprises a constant frequency generator G and a power amplifier PA, both indicated diagrammatically in the drawings. The power unit may be provided with a plug P, adapted for insertion in any convenient receptacle which is connected to a source of commercial 60-cycle power, and a switch S by means of which the connection through the plug may be extended to the apparatus in the power unit.

It is thought that the circuit connections shown in the drawings will be sufficiently clear, but they may be nevertheless briefly explained. The printer may be provided with a two-conductor cord extending from terminals 263 and 264 to the tick amplifier A. This cord will serve to connect up the amplifier with the electro-magnetic units 39 and 40. The printer may also be provided with a six-conductor cord which extends from terminals 265 to 270, inclusive, to the power unit. This cord will serve to connect the output of the power amplifier PA to the motor 34, and to the voltmeter, and will also connect up the voltage control rheostat 44 and the switch 11. It will be observed that with the circuit arrangement shown, when the switch S is closed, the commercial power will be supplied to the constant frequency generator G. One side of the commercial power circuit is also extended to the power amplifier PA and to the primary of the transformer 240 in the rectifier R; but the other side of the power circuit extending to the power amplifier and to the transformer winding is open at the switch 11 in the printer. The switch 11 therefore controls the supply of commercial power to the power amplifier and to the rectifier R, so that these devices can be started or shut down without interfering with the operation of the generator G.

The operation of the complete recording equipment will now be explained. For this purpose it will be assumed that the printer, the amplifier unit, and the power unit are interconnected, as shown in Fig. 15, and that the plug P is inserted in a 60-cycle commercial power outlet. Switch S may be closed, to start up the constant frequency generator G. This apparatus includes a crystal oscillator with a temperature control device, and is adjusted to oscillate at the desired frequency at a temperature which is somewhat above room temperature. It therefore requires some time to warm up and assume a stable operating condition at the frequency for which it is adjusted. The switch 11 may be left open for the time being.

The invention is of course independent of the nature of the power unit employed for operating the motor of the printer, so long as the power unit has an output of constant frequency, and I am aware that other constant frequency generators have been devised, such as those using tuning forks, for example. The power unit referred to herein and described in my copending application is, however, very satisfactory, and it is convenient to assume that it is used.

The cover 3 of the printer may now be removed so that the paper tape 74 can be started through the printer, assuming that this has not already been done. The end of the tape is first cut on a diagonal line, and is then inserted in the slot in plate 4 at the rear of the casing, from which it passes into the chute 63. The tape may be fed along by hand and, due to the diagonal cut at the end, will readily pass over the guide 71. Care must be taken, however, to feed it properly between the printer disks and the ribbon 102. When the end of the tape reaches the rolls 141 and 144, it is inserted between the rolls and gear 134 may then be rotated by hand until the end of the tape is fed out of the slot in plate 5 at the front. The throw-out lever 7 is, of course, placed in depressed position so that gear 133 is disengaged from gear 134, and the latter can be rotated as described. After the tape has been properly started through, the cover can be replaced.

The switch 11 may now be closed, in order to furnish power to the rectifier R and to the power amplifier PA. Before the switch is closed, the voltage control rheostat 245 is preferably turned back, and also the volume control 216 on the tick amplifier. As soon as the power amplifier begins to operate, the output voltage may be read on the voltmeter 8, and the voltage may be increased to the proper operating value. The motor 34 starts up and rotates the printer disks 54 and 55 in a counterclockwise direction as viewed from the front. The disks should rotate freely, without rubbing on the paper tape, although the clearance should be small, on the order of a few thousandths of an inch. It may be assumed that the guide 71 has been adjusted to provide the proper clearance. As the throw-out lever 7 is still depressed, the paper and ribbon advancing mechanisms will be stationary.

A watch may now be placed on the microphone 205, which may be provided with suitable clamping means to hold the watch in position. The ticking of the watch produces mechanical shocks which are transmitted to the piezo-electric element of the michophone and are converted to electrical impulses. At each beat or tick of the watch, therefore, an impulse is produced, which is transmitted to the grid of the amplifying pentode 201. This impulse is amplified and is passed on through the condenser 217 to the control grid of the pentode 202, all in a manner which is well understood and which need not, therefore, be described in detail.

At the pentode 202, the impulse is further amplified and is transmitted through condenser 218 to the control grid of the triode 203. As the triode passes current responsive to the received impulse, the potential at the plate is reduced and the condenser 220, which is normally charged, discharges with the result that the negative potential at the grid of the tube 204 is reduced sufficiently to allow the tube to pass current. Accordingly, the condenser 223, which is normally charged through the resistor 224, discharges over a path which can be traced from one side of the condenser by way of ground, the cathode of tube 204, the plate of said tube, and through the windings of the units 39 and 40 of the printer to the other side of the condenser. The discharge of the condenser is very rapid, and has the effect of inserting the high resistance 224 in the plate circuit of tube 204, which extinguishes the tube and plate current ceases to flow. As soon as the discharge path for condenser 135 is opened at the tube 204, the condenser begins to charge up again through the resistor 224. This resistor has such a value that the condenser 223 cannot charge fast enough to permit the tube 204 to function a second time on the same impulse, but does become charged up enough to supply sufficient plate voltage to operate the tube by the time the second tick impulse arrives. Thus it will be seen that at each watch tick an impulse is produced which is amplified by tubes 201, 202, and 203, and which is effective to trigger the tube 204 and permit the condenser 223 to discharge through the tube and through the windings of the electromagnetic units 39 and 40 of the printer.

The units 39 and 40 are so wound that each impulse is effective to exert a downward pull on the two pull bars 84 and 85, sufficient to bend the two parallel sections of the rod 81 and bring the printer bar 80 down against the ribbon 102. This operation forces the ribbon and paper tape momentarily against a tooth of the rotating printer disk 54, thus printing a short line or dash on the tape. It is noted in this connection that, since the printer bar is as long as the space between teeth, there will always be one tooth in printing position beneath the printer bar. The impulses come in in rapid succession, five times per second if a five-beat watch is being tested, but are of such a short duration that the rotation of the printer disks is not interfered with in the least. The printer bar should be adjusted so that only a very short movement is required to produce the necessary cooperation between the ribbon, tape, and printer disk to effect a printing operation.

As long as the paper tape stands still the impressions made by successive operations of the printer bar will be located at the same point on the tape, or at least on the same transverse line. The lever 7 is therefore moved to its upper position to engage gears 133 and 134 and start the paper drive and also the ribbon-advancing mechanism. The paper tape now begins to be drawn slowly through the printer and as a result the impressions made by the printer bar begin to be spaced out lengthwise of the tape and make their appearance at the window in the cover 3. The volume control 216 may now be adjusted. This device should be set so that the impulses are just strong enough to make a clear and distinct impression on the tape. As soon as the proper adjustment is secured the lever 7 may be depressed to stop the paper drive and prevent the waste of tape.

The apparatus is now ready to commence the testing of watches, which may follow any desired routine within the limits of the apparatus. The foregoing description, which is directed to the initial setup of the apparatus, of course, includes operations which can be dispensed with after the apparatus has been set up and properly adjusted.

The testing of a five-beat watch will first be explained. It will be assumed the watch is in position on the microphone 205, and that the switch 11 is closed. The printer disks will therefore be rotating and the printer bar will be vibrating responsive to tick impulses, all as previously explained. The lever 7 may now be moved to its upper position to start the paper drive. As previously mentioned, as soon as the paper starts moving, the impressions printed thereon responsive to successive watch ticks will be spaced out lengthwise of the tape. These impressions may form a straight line parallel to the edge of the tape, or the line of impressions may diverge either to the right or left, depending on the rate of the watch being tested.

Disregarding the impressions made while the paper is standing still, the first impression made after the paper starts moving will be located at some random point, depending on the instant position of the particular tooth of printer disk 54 which is then passing beneath the printer bar. As the watch beats five times per second, and as the printer disk makes five revolutions per second, the disk will make one revolution per watch beat, and the second impression will be printed by means of the same tooth as the first impression. The location of the second impression with respect to the first depends on whether the watch being tested is keeping correct time or not. If the rate of the watch is correct, the second impression will be printed exactly one-fifth of a second later than the first and as in one-fifth of a second the printer disk will have made exactly one revolution, the disk tooth in use will be in exactly the same position as before. Hence the second impression will be printed in exactly the same position laterally as the first impression, but due to movement of the paper in the meantime will be spaced away from it a short distance linearly, or in a direction parallel to the edge of the tape. Subsequent impressions will be printed on the same line as defined by the first two impressions. Of course, two impressions are not enough to accurately define the trend of the line, and the operator will allow the paper to run until the row of impressions seen through the window is an inch long or so, or long enough to definitely determine if the line of the impressions is parallel to the edge of the tape or not. If it is, then he knows that the watch is keeping correct time.

In Fig. 14, there is shown a section of paper tape 74, on which appear several lines of printed impressions such as might be made in practice. The line of impressions indicated by the reference character 275 is a record of the character which is made by a watch keeping correct time.

It will be assumed now that the next watch tested runs too fast. As in the previous case, the first impression printed after the paper starts moving will be located at some random position on the tape, depending on the position of the tooth which is then passing beneath the printer bar. The second impression will be made slightly less than one-fifth of a second later, as the watch is running too fast, and hence the printer disk will not have had time to make a complete revolution. The particular tooth which cooperated in making the first impression will accordingly not have reached its former position, and the second impression will be printed somewhat to the right of the first one. In the same way each succeeding impression will be printed to the right of the one immediately preceding it, with the result that a line of impressions will be produced trending toward the right, as in the record indicated by reference character 276, Fig. 14. A record having this appearance indicates that the watch under test is running too fast.

It will be clear enough now that if the watch tested is running too slowly, the record made will also depart from parallelism with the tape, but will trend to the left instead of to the right. Suppose, for instance, that the watch which made the record 276 is adjusted to correct its rate, but the adjustment is carried somewhat too far so that the watch is made to run too slowly. Each tick impulse will therefore follow the preceding one by slightly more than one-fifth of a second and the printer disk, rotating each time in exactly one-fifth of a second, will gain on the impulses, and will have advanced a little farther each time an impulse is received. As a result the line of the printed impressions will trend to the left, as in the record 277.

The amount by which a record trends to the right or left within a given length of tape is an indication of how much the watch is too fast or slow. A watch may be so fast, for example, that the record will run off the tape to the right almost at once, as indicated at 278, and will be resumed at the left edge of the tape as the printer bar picks up the next adjacent tooth of the printer disk. It may even occur that the watch is so fast (or slow) that the record appears to be substantially perpendicular to the edge of the tape, and it will be impossible to tell with certainty if the watch is fast or slow. In this event, the paper tape may be rapidly pulled through by hand for several inches, thereby spacing the printed impressions out enough so that the trend to right or left can be determined.

As an aid in calculating the amount in seconds per day by which a watch under test departs from the correct time, the paper tape may be ruled with cross lines such as 280, dividing the tape into timing divisions, and with rate lines such as 281. The paper may be advanced through the printer at the rate of six inches per minute, and the division lines may be one and one-half inches apart. Each timing division will therefore contain a test record of fifteen seconds duration. If the tooth speed is 90 inches per second now, which is the speed in the printer described, the distance between the rate lines may be one-eighth of an inch, and the space between any two rate lines in one timing division will correspond to a loss or gain of eight seconds per day, as can be shown by a simple calculation. That is, if a printed line of impressions departs from parallelism by the space between two rate lines, or one-eighth of an inch, within one timing division, then the watch tested is out of time by eight seconds per day.

The rate of gain or loss is directly proportional to the number of rate lines crossed by the record, but is inversely proportional to the length of the record in timing divisions. Hence if a test has to be run for a period of two timing divisions before a deviation of one rate line can be detected, then the watch is out of time by only four seconds per day. The loss or gain denoted by any record can be computed by the following equation:

$$E = \frac{8}{T} \times R$$

in which

E = error in seconds per day
T = length of record in timing divisions
R = number of rate lines crossed by record.

If desired, the amount of error in seconds per day can be determined by means of the direct reading indicator which is associated with the window in the cover of the casing, as shown in Fig. 1. In using this device, as soon as a sufficient length of record is visible through the window the paper is stopped, and the alignment rod or pointer 18 is adjusted by means of knob 14 until it is parallel to the line of impressions constituting the record. In making this adjustment the scale and knob may be moved to the right or left to bring the rod 18 adjacent to the record. Fig. 1 shows the rod 18 in correct position with relation to the record shown. As soon as the adjustment is made, the gain or loss in seconds per day can be read directly on the scale 13 by observing the position of the pointer 15.

As the direct reading device is used with a record less than two timing divisions in length, it is not as accurate in determining error as the method of computation which employs the ruled paper tape. It has the advantage of speed, however, and is accurate enough for most purposes. In routine watch testing of certain grades of watches, where extreme accuracy is not a consideration, the direct reading attachment has the advantage that blank or unruled paper tape may be used, resulting in a considerable saving.

In the foregoing explanation it has been assumed that the watches tested were beating evenly. A good many watches are out of adjustment in this respect, however, and the time intervals between successive beats are unequal, producing a record such as is shown at 282 in Fig. 14. In this record the printed impressions alternate between the two rows. Such a maladjustment is not very serious, as the watch can be regulated to keep good time. The record is interpreted in the same manner as a single row record. Other defects, such as loose balance wheel bearings, etc., will cause erratic records to be made, having certain characteristics, however, from which the particular trouble can generally be diagnosed by an experienced operator.

If a six-beat watch is to be tested, the shifting knob 9 is pulled forward, causing the printer disk assembly to be moved to the rear, or to the left as seen in Fig. 7, so as to position the printer disk 55 beneath the printer bar. This disk has twelve teeth instead of eleven. It can also be used in testing five-beat watches, as the disk speed of five rotations per second insures that the same tooth will be used in printing successive impressions, and the number of teeth, therefore, is immaterial in testing five-beat watches. With a twelve-tooth disk, however, it may be stated that the disk rotates at the rate of twelve teeth per beat, in the case of five-beat watches.

Now, the ratio of the beat frequency of a six-beat watch to that of a five-beat watch is as twelve is to ten, and since the rate of disk rotation in terms of teeth per beat is inversely proportional to the beat frequency, it will readily be seen that the number of teeth which pass a given point per beat is ten, in the case of a six-beat watch. In other words, the six-beat watch gains on the rotating disk exactly two teeth per rotation, and alternate teeth are used in printing successive impressions. That is, if the teeth are assumed to be numbered from one to twelve in the direction of disk rotation, and if it be assumed that a given impression is printed by means of the first tooth, then the succeeding impressions are printed by means of the third, fifth, seventh, etc., teeth. The result is of course the same as when testing a five-beat watch, as the teeth are equally spaced.

In order to test a five and one-half beat watch, the shifting knob 9 is pushed in again, bringing the eleven-tooth printer disk 54 into position beneath the printer bar. Using the eleven-tooth disk, the tooth speed for a five-beat watch is eleven teeth per beat. The ratio of the beat frequency of a five and one-half beat watch to that of a five-beat watch is as eleven is to ten, and hence the tooth speed for a five and one-half beat watch is ten teeth per beat. Therefore, in the case of a five and one-half beat watch the rotating printer disk falls short of making a complete rotation per beat by exactly one tooth, and successive impressions are printed by means of successive teeth. That is, if a given impression is printed by means of the first tooth, then the next impression will be printed by means of the second tooth, the next by the third, and so on.

The reason for the non-parallel relation between the ribbon and the printer bar will now be readily appreciated, in view of the fact that printing takes place at random points along the printer bar, depending on the position of the printer disk tooth used. As can be seen from Fig. 3, if printing takes place at the left-hand end of the printer bar, a portion of the ribbon near the forward edge will be used, while if printing takes place at the right-hand end of the printer bar, the portion of ribbon employed will be near the rear edge of the ribbon. Intermediate portions of the ribbon will be employed in printing at intermediate points on the printer bar. As the point on the printer bar where printing takes place is a matter of chance, the result is that the entire ribbon will be used, except for a narrow strip along each edge, and the ribbon will last many times longer than it would if it were parallel to the printer bar.

The ribbon-reversing mechanism is operated to reverse the direction of ribbon travel whenever the ribbon becomes substantially entirely transferred from one spool to the other, as previously mentioned. In order to notify the operator of this condition the ribbon is preferably provided with a red section a foot long or so at each end. When the printer begins to turn out red records instead of black, the operator knows that it is time to reverse the ribbon and will operate the reversing knob 6.

When testing is over for the day, or if it is to be discontinued for an appreciable length of time, the switch 11 is opened to shut down the power amplifier and the tick amplifier. The switch 8 should be left closed, however, as it is advisable to maintain the constant frequency generator G in continuous operation. This is in fact necessary if the generator is used to operate a master clock, as will usually be the case, and it is desirable in any event to avoid the warming-up period which would otherwise be required each time at the beginning of testing operations.

Figure 16:
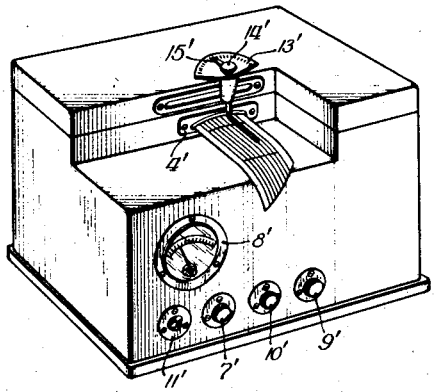
Fig. 16 is a perspective view of a modified form of printer, arranged so that the tape can be torn off close to the printer disks.
Figure 17:
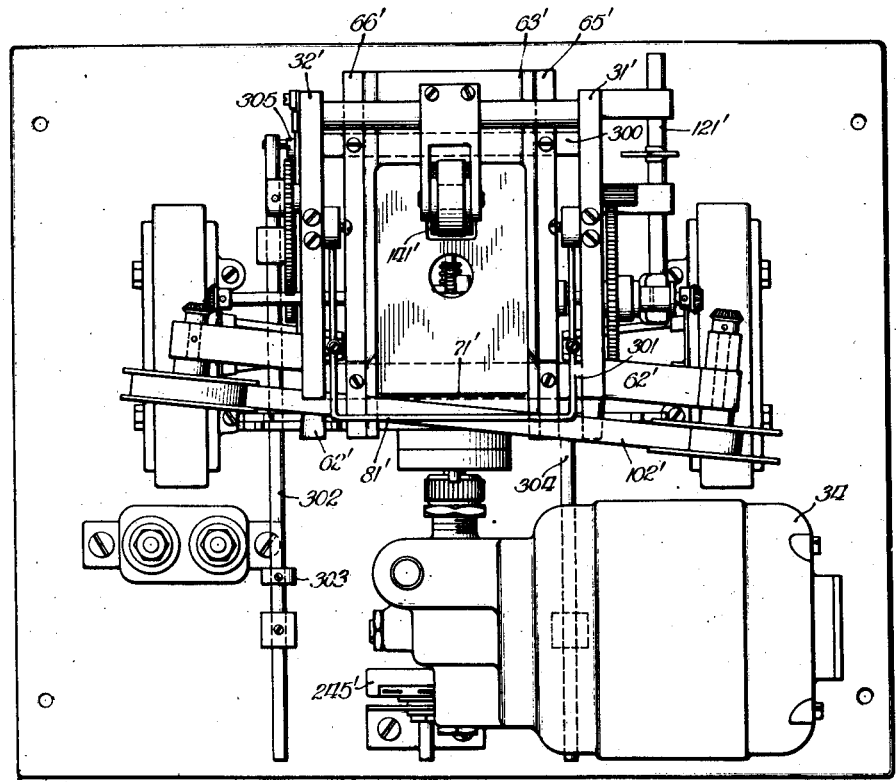
Fig. 17 is a top view of the modified printer with the casing removed.

Referring now to Figs. 16 and 17, the modified form of printer which is shown here will be briefly described. The object of the modification is to produce a printer which is so arranged that a record becomes accessible outside the printer casing as soon as possible after it is completed, where it can be cut or torn off and sent along with the watch to the adjuster. This object is accomplished by reversing the motor, which reverses the direction of rotation of the printer disks and the direction of paper feed, and by arranging the casing so that the paper is fed out immediately after it leaves the printer disk. The entire printer is also reversed, that is, the back becomes the front, and the various controls, with the exception of the ribbon reverse, are arranged so that they can be operated from in front.

While the modification is produced in the main by a reversal of the printer and certain parts thereof, as stated, there are a few changes necessary which will be explained. Consideration may be given first to the paper chute 63', which is modified by cutting off the apron 97 with which the chute 63 of the first described modification is provided, by cutting out an opening for the roll 141', and by extending the bars 65' and 66' to the end of the chute. Thus modified, the chute is reversed and is mounted on the other side of the printer disks in place of the plate 150 and guide 98, which are removed. In its new position the chute is supported on two cross members 300 and 301 secured between the frame plates 31' and 32', as clearly shown in the drawings. The guide 71' is mounted on the cross member 301 which is adjacent the printer disks.

The bracket 62 of the former modification is also modified by cutting off the entire transverse portion, leaving only enough of the ends 62' which are secured to the frame plates to afford a guide for the ribbon.

In order to provide for operating the throw-out lever 135', a bell crank 305 is mounted on the frame plate 32', as shown in the drawings. One arm of the bell crank is attached to the throw-out lever, and the other arm has connected to it a pull rod 302 which extends forward past the printer disk and carries an operating knob 71 on the front of the casing. The throw-out lever 135' is operated by pulling out on this knob, which disengages the gears to stop the paper feed. Pressing in the knob engages the gears to start the paper feed.

The printer disk shifting mechanism is also rearranged so that it can be operated from in front of the printer. The lever such as 58 is made somewhat longer and dropped down from the shaft 69 at an angle to a point adjacent the frame plate 31'. The pull rod 304 is thus able to pass beneath the printer disks and beneath the motor, as shown in the drawings.

The ribbon-reversing mechanism is not changed, and the reversing knob accordingly is located on the back of the printer. This is no great inconvenience, as the ribbon reverse only has to be operated at comparatively long intervals.

Referring now to Fig. 16, it will be seen that the left-hand forward portion of the casing is recessed to form a depressed shelf. The voltmeter 8' and the various controls appear below this shelf on the front of the casing. The first control at the left is the switch 11'. Next comes the knob 71 for operating the gear throw-out mechanism, followed in order to the right by the voltage control knob 10' and the printer disk shifting knob 9'.

The direct reading indicator comprising pointer 15' and scale 13' is slidably mounted on the cover just to the rear of the shelf, as seen clearly in the drawings. Below the indicator is the slotted escutcheon plate 4' through which the paper tape is fed from the printer. This plate lies just in front of the printer disks and is preferably provided with a sharp edge on the upper side of the slot to facilitate tearing off the tape.

The circuit connections, including the arrangement of the power unit and tick amplifier, are unchanged. The reversal of the motor is accomplished by reversing one pair of windings as regards their connection to the incoming power leads.

The operation of the modified printer may now be explained, and for this purpose it will be assumed that the complete equipment is connected up as described in connection with Fig. 15, and that the switch 11' is closed. Accordingly, the printer disks will be rotating and the tick amplifier will be in operative condition. A watch to be tested is now placed on the microphone 205, and the throw-out control knob is pressed in to start the paper feed. The tick amplifier operates the printer bar responsive to the watch ticks, and the printer bar cooperates with one of the printer disks to print a line of impressions on the tape, as previously explained. The tape is fed out through the slot in plate 4' immediately after leaving the printer disk and, accordingly, after a few impressions have been printed, the record begins to make its appearance above the shelf in front of the indicator.

The operator allows the printer to run until a length of tape equal to about one timing division has been fed through and then stops the paper feed. The indicator knob is now adjusted with reference to the record in the manner previously explained, and the error, if any, is read directly in seconds per day. The operator next makes a notation of the reading on the tape adjacent the record, as "20 seconds fast," and slides the indicator knob to one side as far as it will go, after which the extruding length of tape is torn off against the sharp upper edge of the slot. The tested watch may now be removed from the microphone and, together with the short length of tape bearing the record, is passed on to an adjuster for the necessary regulation. Another watch is then placed on the microphone, and the performance is repeated.

It will be seen that the modified printer is especially well adapted to the rapid testing of large numbers of watches in a watch factory, where the testing and regulation are done in different departments. In the testing department one or more printers may be in continuous operation testing watches. As each watch is tested the section of tape bearing the record is torn off and accompanies the watch to the regulating department. A suitable form of conveyor belt running past the printer or printers may be used as a convenient forwarding means.

While certain concrete embodiments of the invention have been used as the basis of the preceding description, it will be understood that this has been done as a matter of convenience, and for the sake of clarity in explaining the principles of operation. The invention is not limited to the specific disclosure, but is capable of being modified to suit different conditions, and may even be adapted to purposes other than watch timing. I do not, therefore, wish to be restricted to the exact form of the invention which is shown and described, but desire to include and have protected by Letters Patent all forms and modifications which come within the scope of the appended claims.

I claim:

1. In a recording device, a rotatable disk having spaced peripheral projections thereon, a printer bar spaced away from said disk in the same plane and having a curved operative surface at least as long as the spacing between said projections, means for feeding a strip of record material between said bar and disk in a direction perpendicular to the plane of the disk, means for operating said bar in random time relation to the instant angular position of the rotating disk, and means including said bar and a projection on said disk for marking said material at a point which depends on the position of said projection at the time the bar is operated.

2. In a watch timing apparatus, a disk, means for driving said disk at a constant predetermined speed, a record tape, means for moving said tape past the edge of said disk in a direction parallel to its rotation axis, projections on said disk rotated successfully across the line of travel of the tape, printing means adapted to cooperate with said projections to make successive record marks on the tape, and means responsive to the beats of a watch being tested for actuating said printing means.

3. In a watch timing apparatus, a disk having a plurality of equally spaced projections thereon, means for rotating said disk at predetermined constant speed, a record tape as wide as the spacing between said projections, means for linearly advancing the tape past the edge of said disk in a direction parallel to its rotation axis, printing means including a device adapted to momentarily press the tape against a projection on the disk at intervals, thereby printing successive marks thereon at points whose transverse position is determined by the relation between the speed of the disk and the timing of the printing operations, and means responsive to the beats of a watch being tested for actuating said printing mechanism.

4. In a watch timing apparatus, recording means including a printer bar, a plurality of rotatable disks, spaced projections on said disks adapted to cooperate with said printer bar, there being a different number of projections on each disk, whereby each disk is adapted for use in timing a different type of watch, and shifting means for associating any one of said disks with said printer bar.

5. In a watch timing apparatus for timing watches having different beat frequencies, a rotatable disk, a strip of record material and means for feeding it past the edge of said disk, teeth on said disk whose number is evenly divisible by the beats of one watch per time unit, means for rotating said disk at a speed which measured in rotations per time unit is evenly divisible by the beats of the other watch per time unit, said time units being the same, means cooperating with said teeth for marking said strip, and means adapted to respond to the beats of either watch for controlling said marking means.

6. In a watch timing apparatus, a casing having a window therein, means for feeding record material past said window inside the casing, means inside said casing responsive to the ticking of a watch for marking a line of impressions on the moving record material before it reaches said window, the direction of said line depending on the timing of the watch, and means associated with said window for interpreting the directional trend of said line in terms of gain or loss per unit time interval, said means including an indicator and scale outside the casing and a member inside the casing which is adjustable in accordance with the direction of said line.

7. In a recording device, a strip of record material, a rotatable element having means for supporting said strip at a variable point which moves transversely across the strip during rotation of the element, a printer bar extending transversely across said strip on the opposite side thereof from said rotatable element, means for feeding said strip between the said rotatable element and printer bar in a direction perpendicular to the bar, a ribbon for enabling said printer bar to cooperate with said supporting means by pressing the ribbon and strip together to mark said strip at different transverse positions depending on the timing of the operations of the bar with respect to the instant positions of said supporting means, and means for continuously feeding said ribbon between said printer bar and strip in non-parallel relation to the printer bar, whereby the opposite ends of said bar are adapted to cooperate with laterally displaced portions of said ribbon.

8. In a recording device, a strip of record material, a rotatable toothed disk, a printer bar spaced away from the toothed edge of said disk and having a curved operative portion conforming to the curvature of said disk, means for feeding said strip between said disk and bar in a direction perpendicular to the plane of the disk including guiding means for producing a transverse curvature in the strip where it passes the disk, and means including said disk and bar for marking said strip.

9. In a watch timing apparatus for timing two different beat watches, recording means, a rotatable member provided with two circumferentially extending rows of separate spaced elements adapted to cooperate with said recording means in making a line of marks on a moving tape, the number of elements in one row being evenly divisible by the beat frequency of one watch and the number of elements in the other row being evenly divisible by the beat frequency of the other watch, means for producing a relative movement between said recording means and said member, whereby the recording means may be brought into operative tape marking relation with either row of elements at will, and watch beat responsive means for controlling said recording means.

10. In a recording device, recording means including a marking device, means for operating said device at different frequencies, a rotatable member driven at a standard frequency, two circumferentially extending rows of separate marking elements on said member adapted to cooperate with said device, the numbers of elements in said rows being evenly divisible by the said different frequencies, respectively, and means for producing a relative movement between said marking device and said member, whereby said device may be associated with either row of elements at will.

11. In a watch timing apparatus, two circular rows of marking elements, the number of elements in one row being evenly divisible by a given beat frequency, and the number of elements in the other row being evenly divisible by a second beat frequency, means for rotating said elements about the common axis of said rows at a constant speed which measured in revolutions per second is evenly divisible by a third beat frequency, a common marking element, means for associating said element with either of said rows at will, means responsive to the beats of a watch being tested for periodically moving said common element into operative relation with a moving element of the row with which the common element is associated, and means including said common element and the moving elements of the associated row for making rate records of watches having said third beat frequency and watches having either the first or second beat frequency depending on the row which is associated with said common element.

12. In a timing apparatus, a constant speed device, means controlled by a device whose speed is to be timed cooperating with said first device to mark a line of impressions on record material, the direction of said line being indicative of the relative speeds of said devices, a member adjustable in accordance with the direction of said line, means for supporting said member close to said marking means and in a position such that the line of impressions is extended in operative relation to said member as the impressions are formed, and an indicator and scale moved relative to each other by adjustment of said member, the said scale cooperating with said indicator to show in suitable time units the difference between the speeds of said devices.

13. In a watch timing apparatus, a casing which is recessed in front, such recess being defined at the bottom by a flat surface which forms a portion of the top of the casing and at the rear by a vertical wall which forms a portion of the front of the casing, means for feeding a strip of record material in an outward direction through said vertical wall, there being an opening in the said vertical wall for departure of the strip, said flat surface acting as a shelf to support the strip after it leaves the casing, recording means inside said casing controlled by a watch under test to mark a record on said strip indicative of the rate of the watch, and marking elements included in said recording means which are located close adjacent the departure opening in said vertical wall, whereby successive records can be separated from each other with a minimum waste of tape.

14. In a timing device, the combination with a record tape of a rotatable disk having spaced projections thereon, means including a shaft for rotating said disk to move said projections successively across said tape, a printer bar for cooperating with said projections to mark said tape, means controlled by apparatus being timed for actuating said bar periodically, means coupled to said shaft for advancing said tape to space successive marks thereon, and means for starting and stopping the advance of said tape at will while the rotation of said shaft and member continues.

15. In a timing device, a motor driven at constant speed, a member bearing a circular row of printing elements and rotated by said motor, feeding mechanism driven by said motor for advancing a strip of record material across said row of elements, a device controlled by apparatus to be timed for cooperating with one or more of said elements to make successive marks on said strip, and means for stopping and starting said feeding mechanism at will while said member is rotating.

16. In a watch timing apparatus, a rotatable member having a circular row of equally spaced peripheral projections thereon, means for rotating said member at constant speed, a record tape and means for advancing it across said row of projections in a direction parallel to the rotation axis of said member, said tape being slightly wider than the spacing between adjacent projections, whereby there is always at least one projection moving past the tape, means responsive to the beats of a watch being tested for periodically pressing the tape against the projection at that moment moving past it, and means for marking the tape each time it is pressed against one of said projections.

17. In a watch timing apparatus, a printing bar, means responsive to beats of a watch being tested for periodically actuating said bar, a plurality of printing elements, means for moving said elements at constant speed in an orbit a section of which is parallel to said bar, the speed of said elements being such that a random one of said elements passing through said section during the first actuation of said bar will continue to pass through said section during succeeding actuations thereof, for a period of time dependent on the rate of the watch being tested, and means including said bar and said last mentioned element for making a record indicative of the rate at which the operative position of the element drifts through said section.

18. In a timing apparatus, a strip of record material, a marking element, means for moving said element at constant speed in an orbit a relatively small section of which extends crosswise of said strip, a second marking element extending across the strip parallel to said section, means controlled by the apparatus being timed for periodically actuating said second element, means including said elements for marking said strip each time the second element is actuated, provided the rate of said apparatus is correct, and a plurality of other elements moving in said orbit in spaced relation to said first element and adapted to successively cooperate with said second element in marking said strip if the rate of said apparatus is incorrect.

19. In a timing device, a circular row of marking elements, means for rotating said elements about the axis of the row, a common marking element spanning an arc of said row of such length that as the elements rotate at least one element is always within said arc, means controlled by apparatus being timed for periodically operating said common element, the number of said elements being so related to their rotational speed and to the frequency at which said common element is operated that different non-adjacent elements move within said arc during successive operations of said common element, and means including said common element and the moving element which at the moment is within said arc for recording the instantaneous position of such moving element each time the common element is operated.

20. In a timing apparatus, the combination with a strip of record material and means for linearly advancing it, of a marking device spanning said strip, a rotatable member bearing a plurality of marking elements adapted to move successively past said strip parallel with said marking device, means controlled by impulses the frequency of which is being timed for periodically operating said marking device, and means for rotating said member at a predetermined constant speed which bears such a relation to the impulse frequency and the number of marking elements that all said elements except one pass said strip between successive impulses whereby as said marking device responds to successive impulses it cooperates with successive adjacent marking elements to mark impressions on said strip.

21. In an apparatus for timing periodic impulses, a toothed disk rotated at constant speed, a member positioned just outside the periphery of said disk and close to the plane thereof, means for feeding a record tape across the edge of said disk and beneath said member, means responsive to said impulses and cooperating with the teeth on said disk to mark on said tape a line of impressions a portion of which line appears adjacent said member while the line is being formed, means for adjusting said member in accordance with the direction of said line, an indicator set by adjustment of said member, and a scale cooperating with said indicator to show in suitable time units the amount which the frequency of said impulses is fast or slow.

22. In a timing apparatus, a casing having an opening in one wall thereof for the departure of a strip of record material, means inside said casing for feeding the strip through said opening, and marking elements including a rotatable toothed disk positioned close to said wall inside said casing and between said wall and said feeding means, the plane of said disk being parallel to said wall.

23. Apparatus for timing a train of periodic impulses comprising a record tape, an element having a smooth tape supporting surface spanning only a small fraction of the width of said tape, means for repeatedly moving said element across the tape in operative relation thereto at the correct frequency of said impulses, printing means including a printer bar spanning the whole width of the tape and adapted to cooperate with said element to mark the tape, means responsive to successive impulses for operating said printing means during successive movements of said element across the tape, whereby the tape is marked each time at a point depending on the instant position of the said element, and means for linearly advancing the tape, whereby successive marks are linearly spaced thereon in a line the direction of which indicates whether the frequency of the impulses is fast or slow.

24. Apparatus for timing periodic impulses, comprising a tape composed of record material, a printing bar spanning said tape, a rotatable disk positioned in the plane of said bar on the opposite side of said tape, said disk having a plurality of positioning elements, means responsive to successive impulses for periodically actuating said bar, means for rotating said disk at a constant speed sufficient to move all said elements past said tape during one actuation of said bar and before the next actuation thereof, means including said bar and a random one of said elements for marking said tape at the first actuation of said bar, means including said bar and the same element or an adjacent element for marking said tape upon succeeding actuations of said bar, the element used depending on the frequency of said impulses, and means for linearly advancing said tape to space the marks on a line the direction of which indicates whether the frequency is high or low.

25. In a device for recording periodic impulses, a disk, means for rotating said disk at constant speed, means for feeding a strip of tape across the edge of said disk in a direction parallel to its rotation axis, a ribbon extending across the tape in line with the edge of said disk and on the opposite side of said tape from the disk, a plurality of spaced teeth on the said disk, each tooth having a smooth rounded surface next to the tape, the spacing of said teeth being such that there is always one tooth moving across the tape, a printing bar spanning the tape above said ribbon, and means responsive to said impulses for periodically actuating said bar to press said ribbon and tape momentarily against the particular tooth of said disk which is passing the tape.

26. In an apparatus for timing periodic impulses, a record tape, means for printing marks on said tape, means responsive to each impulse for operating said printing means, a plurality of equally spaced positioning elements for determining the transverse position of such marks, means for moving said elements successively and repeatedly across said tape in operative relation thereto and at a constant speed such that a predetermined plurality of said elements pass said tape in each interval between successive impulses, the number of said elements being so related to their speed and the frequency of said impulses that if the frequency is correct there will be a positioning element in the same transverse position with respect to the tape each time said printing means is operated, and means for feeding said tape to space the marks lengthwise thereof.

27. In an apparatus for timing periodic impulses of two different frequencies by comparing either frequency with a frequency standard, the correct values of said different frequencies being known, a record tape, a plurality of equally spaced elements, means including said frequency standard for moving said elements successively and repeatedly across said tape at a constant speed which if measured in elements per time unit has a value represented by a whole number which is a multiple of the correct values of said different frequencies, printing means adapted to cooperate with one of said elements to mark said tape each time said printing means is operated, means responsive to impulses of either of said different frequencies for operating said printing means, and means for linearly advancing said tape to space successive marks lengthwise thereof in a line which is parallel to the tape if the frequency being timed is correct.

THOMAS B. GIBBS.